United States Patent [19]

Kameyama et al.

[11] Patent Number: 5,111,372
[45] Date of Patent: May 5, 1992

[54] DC-DC CONVERTER

[75] Inventors: Shigeru Kameyama; Koji Arakawa, both of Tsurugashima; Kazushi Watanabe, Nagaoka; Hitoshi Yoshioka, Kawasaki; Isami Norigoe, Inagi, all of Japan

[73] Assignees: Toko Kabushiki Kaisha; Nemic Lambda Kabushiki Kaisha, both of Tokyo; Yutaka Electric Mfg. Co., Ltd., Kanagawa; Densetsu Corporation, Tokyo, all of Japan

[21] Appl. No.: 594,027

[22] Filed: Oct. 9, 1990

[30] Foreign Application Priority Data

Oct. 14, 1989 [JP] Japan .................................. 1-266615

[51] Int. Cl.$^5$ .............................................. G05F 3/335
[52] U.S. Cl. ......................................... 363/20; 363/16
[58] Field of Search ...................... 363/19, 20, 21, 16, 363/95, 97, 131

[56] References Cited

U.S. PATENT DOCUMENTS

| 4,809,148 | 2/1989 | Barn ...................................... 363/20 |
| 4,959,764 | 9/1990 | Bassett ................................... 363/16 |
| 4,975,821 | 12/1990 | Lethellier ............................. 363/21 |

Primary Examiner—Peter S. Wong
Attorney, Agent, or Firm—Stevens, Davis, Miller & Mosher

[57] ABSTRACT

A DC-DC convertor includes a transformer having a primary winding adapted to be connected in series with a DC power source and a secondary winding, a rectifier and smoothing circuit, a main switching device, adapted to be connected in series with the DC power source, for connecting the rectifier and smoothing circuit to the secondary winding of the transformer when the main switching device is in an on-state, an auxiliary switching circuit connected in parallel with the main switching device, and a signal generating circuit for providing a first control signal to the main switching device and a second control signal to the auxiliary switching circuit. The auxiliary switching circuit includes a first capacitor connected in parallel with a second capacitor that is connected in series with an auxiliary switching device. The signal generating circuit controls on/off operation of the main switching device and the auxiliary switching device such that both the main switching device and the auxiliary switching device are in an off state simultaneously in a manner wherein the main switching device turns on after a first rest period has elapsed after the auxiliary switching device turns off and the auxiliary switching device turns on after a second rest period has elapsed after the main switching device turns off.

4 Claims, 3 Drawing Sheets

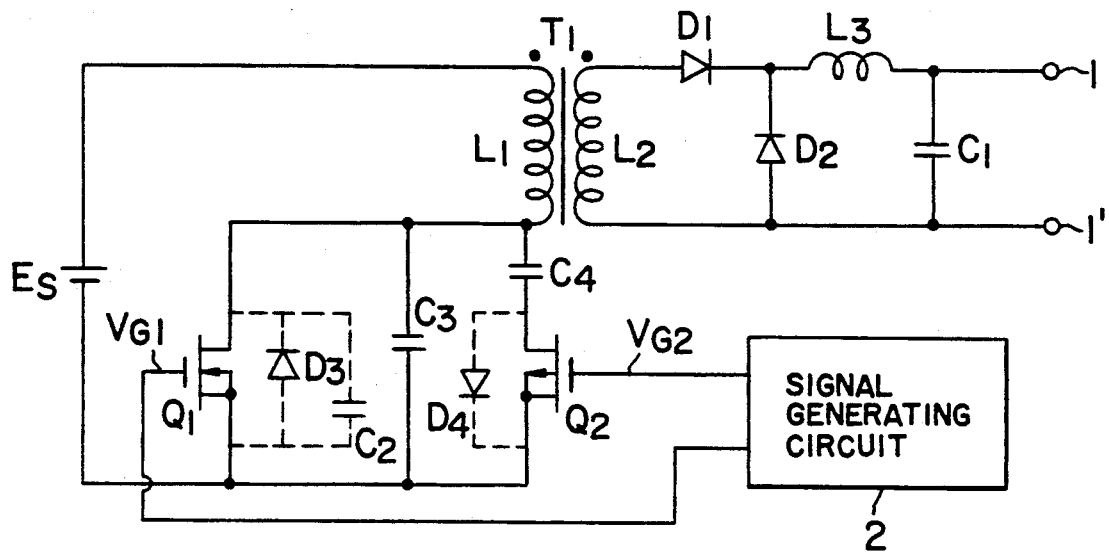
F I G. 1
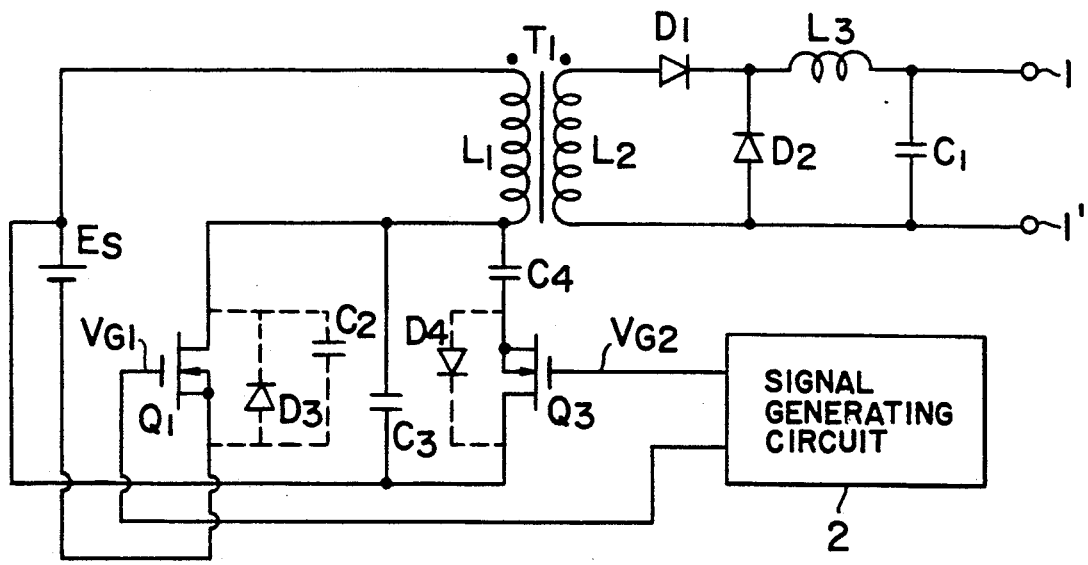
F I G. 2

DC-DC CONVERTER

The present invention relates to the structure of a DC—DC converter designed to reduce losses.

BACKGROUND OF THE INVENTION

1. Description of the Prior Art

Recent developments in switching elements that can be used at high frequencies have resulted in an increase in the switching frequencies of DC—DC converters, and this in turn has led to expectations of reductions in the size of DC—DC converters because it should now be possible to construct smaller versions of the transformers, choke coils, and smoothing capacitors that take up so much room conventionally.

However, the switching losses that occur as current and voltage are superimposed whenever switching elements turn on and off increase as frequencies increase. This means that, regardless of how small these components and other circuit elements become, at present the heat dissipation countermeasures necessary for coping with the heat generated by switching losses ensure that sizes cannot be reduced further.

As the frequencies of DC—DC converters have increased, it has become common to use insulated-gate field-effect transistors. However, insulated-gate field-effect transistors have the problem of parasitic capacitances; if such a transistor is switched on or off while voltage is applied thereto, the parasitic capacitance causes a short circuit, which generates noise. Therefore, countermeasures against this noise are also necessary.

A circuit diagram of a conventional forward DC—DC converter with one switching transistor is shown in FIG. 4, and the timings of voltage and current waveforms in this DC—DC converter are shown in FIG. 5.

In this DC—DC converter, a DC source $E_s$, a primary winding $L_1$ of a transformer $T_1$, and an insulated-gate field-effect transistor $Q_1$ that acts as a switching element form a series circuit, and a rectifying and smoothing circuit formed of a rectifier diode $D_1$, a flywheel diode $D_2$, a choke coil $L_3$, and a smoothing capacitor $C_1$ is connected to a secondary winding $L_2$ of the transformer $T_1$.

The transistor $Q_1$ receives a gate voltage from a control circuit that is not shown in the figure.

While the transistor $Q_1$ of the above DC—DC converter is on, a current flows through the primary winding $L_1$ on the input side of the transformer $T_1$, and a DC output is obtained at output terminals 1 and 1' from a voltage induced in the secondary winding $L_2$ on the output side, using the rectifying and smoothing circuit.

FIG. 5 shows the waveforms of the gate voltage $V_{G1}$ of the transistor $Q_1$, the drain-source voltage $V_{Q1}$ of the transistor $Q_1$, and the current $I_{Q1}$ flowing through the transistor $Q_1$ via the primary winding $L_1$, expressed against the same horizontal time axis. As can be seen from the figure, the drain-source voltage $V_{Q1}$ and the current $I_{Qt}$ are superimposed during a period between a time $t_1$ at which the transistor $Q_1$ turns on and a subsequent time $t_2$, and during a period between a time $t_3$ at which the transistor $Q_1$ turns off and a subsequent time $t_4$. This superimposition causes power losses.

SUMMARY OF THE INVENTION

1. Purpose of the Present Invention

The object of the present invention is to provide a DC—DC converter with one switching transistor in which losses can be reduced when switching elements are turned on and off.

2. Mode of Use of the Present Invention

The present invention relates to a DC—DC converter comprising a DC power source, a primary winding of a transformer, and a main switching element connected in series, whereby a DC output is extracted via a rectifier and smoothing circuit connected to a secondary winding of the transformer.

The DC—DC converter is further provided with a main circuit comprising a first capacitor and a series circuit of a second capacitor and an auxiliary switching element formed of an insulated gate field effect transistor, both connected in parallel to the main switching element; and a signal generating circuit which generates gate signals for each gate of the main switching element and the auxiliary switching element, the gate signals providing a rest period during which switching elements are off in such a manner that the main switching element turns on after a first rest period has elapsed after the auxiliary switching element has turned off and the auxiliary switching element turns on after a second rest period has elapsed after the main switching element has turned off, wherein the first rest period is set to between ¼ and 1/6 of a resonance period determined by the inductance of the transformer and the first capacitor and the second rest period is set less than ½ of the period during which the main switching element is off.

BRIEF DESCRIPTION OF THE DRAWINGS

FIG. 1 is a circuit diagram of an embodiment of the DC—DC converter of the present invention, FIG. 2 is a circuit diagram of another embodiment of the DC—DC converter of the present invention.

DESCRIPTION OF THE PREFERRED EMBODIMENT

Figure 4:
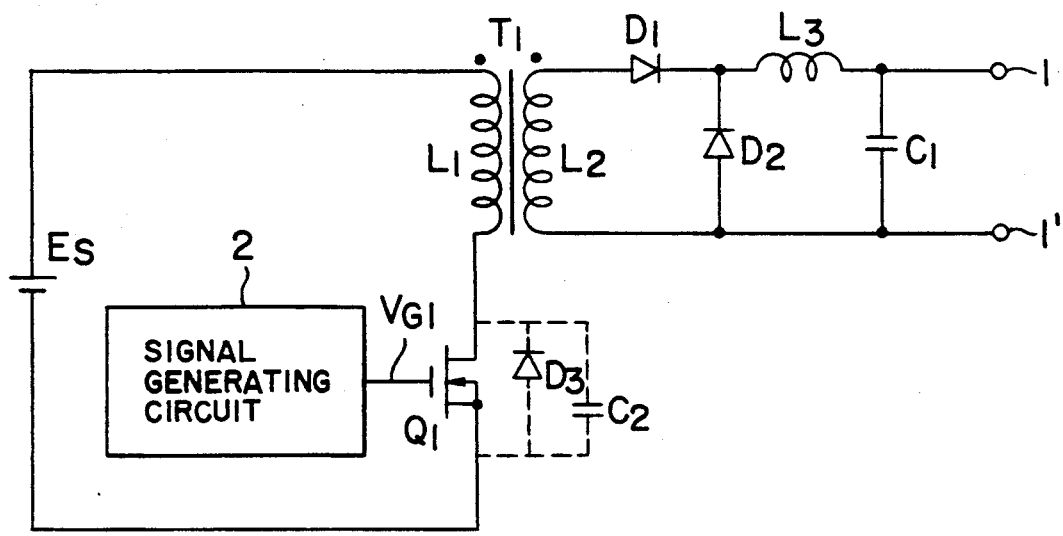
FIG. 4 is a circuit diagram of a conventional DC—DC converter.
Figure 5:
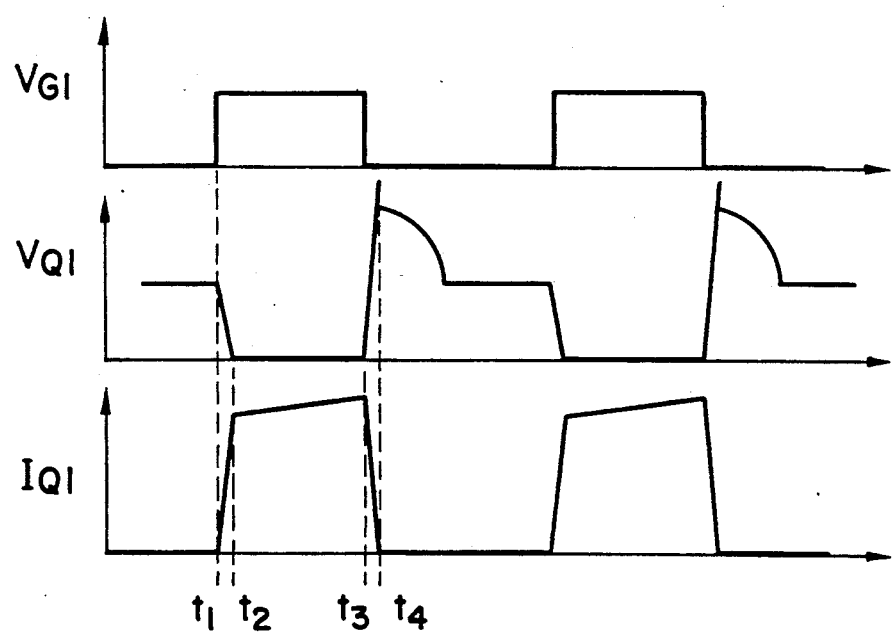
FIG. 5 is a timing chart of currents and voltages in the DC—DC converter of FIG. 4.

An embodiment of the DC—DC converter of the present invention will be described below with reference to FIG. 1. Elements in FIG. 1 that are the same as those in FIG. 4 are denoted by the same reference notation.

FIG. 1 shows a DC—DC converter with one switching transistor which transfers power from a primary winding to a secondary winding during a period in which a main switching element is on. It comprises a series circuit of a DC source $E_s$, a primary winding $L_1$ of a transformer $T_1$, and an n-channel insulated-gate field-effect transistor $Q_1$ that acts as a main switching element, with a rectifying and smoothing circuit formed of a rectifier diode $D_1$, a choke coil $L_3$, and a smoothing capacitor $C_1$ being connected to a secondary Winding $L_2$ of the transformer $T_1$.

A first capacitor $C_3$ and a series circuit formed of a second capacitor $C_4$ and a p-channel insulated-gate field-effect transistor $Q_2$ are both connected in parallel to the transistor $Q_1$. The transistor $Q_2$ acts as an auxiliary switching device, as will be described later. $D_4$ denotes a parasitic diode of the transistor $Q_2$ and $C_2$ denotes a parasitic capacitor of the transistor $Q_1$.

Rest periods during which both switching elements are off are set in such a way that the transistor $Q_1$ turns on after a first rest period has elapsed after the transistor $Q_2$ turns off, and the transistor $Q_2$ turns on after a second rest period has elapsed after the transistor $Q_1$ turns off, transistors $Q_1$ and $Q_2$ being applied gate voltages from signal generating circuit 2.

The operation of the DC—DC converter of the above construction will now be described with reference to the timing chart of FIG. 3.

Figure 3:
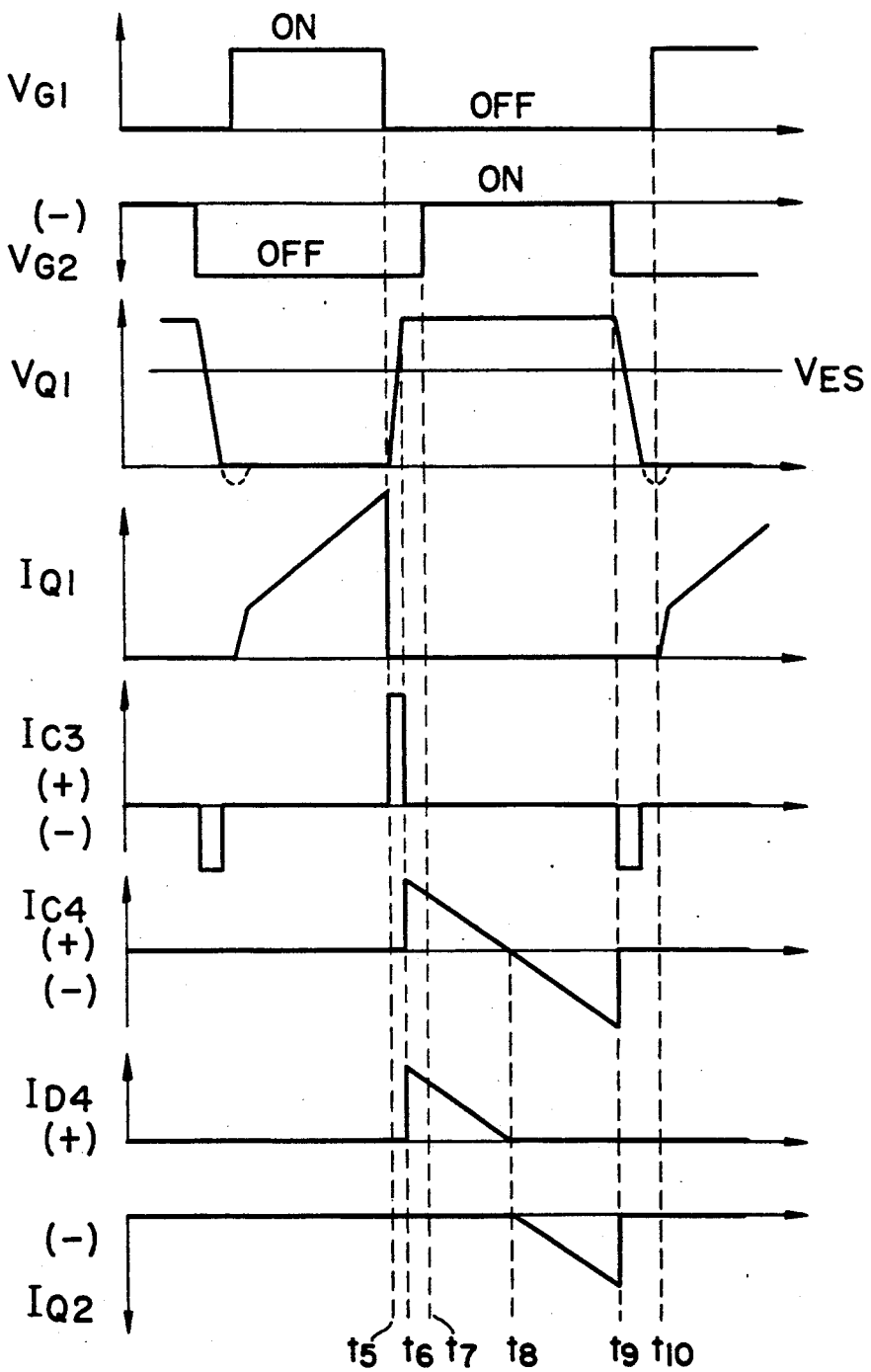
FIG. 3 is a timing chart of currents and voltages in the DC—DC converter of FIG. 1.

FIG. 3 shows the waveforms of a gate voltage $V_{G1}$ of the transistor $Q_1$, a gate voltage $V_{G2}$ of the transistor $Q_2$, a drain-source voltage $V_{Q1}$ of the transistor $Q_1$, a current $I_{Q1}$ flowing from the drain to the source of the transistor $Q_1$, a current $I_{c3}$ flowing through the capacitor $C_3$, a current $I_{c4}$ flowing through the capacitor $C_4$, a current $I_{D4}$ flowing through the parasitic diode $D_4$ of the transistor $Q_2$, and a current $I_{Q2}$ flowing from the drain to the source of the transistor $Q_2$, expressed against the same horizontal time axis.

First, at a time $t_5$ at which the transistor $Q_1$ turns off, the current $I_{Q1}$ flowing from the drain to the source of the transistor $Q_1$ falls to zero, and a magnetizing current that was part of the current flowing through the primary winding $L_1$ flows as an excitation current through the parasitic capacitor $C_2$ and the capacitor $C_3$, charging the parasitic capacitor $C_2$ and the capacitor $C_3$.

Since the capacitor $C_3$ is connected in parallel to the transistor $Q_1$, the capacitance between the drain and source of the transistor $Q_1$ is added thereto. The drain-source voltage $V_{Q1}$ rises smoothly in accordance with Equation (1) below, and there is no period during which the current $I_{Q1}$ flowing from drain to source is superimposed thereon.

$$V_{Q1} = I \cdot t / (C_2 + C_3) \quad (1)$$

In Equation (1), I is magnetizing current, t is time, $C_2$ is the capacitance of the parasitic capacitor $C_2$, and $C_3$ is the capacitance of the capacitor $C_3$.

At a time $t_6$ at which the drain-source voltage $V_{Q1}$ of the transistor $Q_1$ exceeds the voltage $V_{C4}$ of the capacitor $C_4$ which has been charged previously, the magnetizing current flowing along the path formed of the capacitor $C_4$ and the parasitic diode $D_4$ of the transistor $Q_2$ starts to charge the capacitor $C_4$. It should be noted that in normal operation the voltage $V_{c4}$ charged in the capacitor $C_4$ is higher than the voltage $V_{ES}$ of the DC source $E_S$.

At a time $t_8$ at which all of the magnetizing energy of the primary winding $L_1$ of the transformer $T_1$ has been transferred to the capacitor $C_4$, the current $I_{c4}$ flowing through the capacitor $C_4$ becomes zero. The period between the time $t_5$ and the time $t_8$ is ½ of the period during which the transistor $Q_1$ is off in normal operation.

At a time $t_7$ before the current $I_{c4}$ becomes zero, the gate voltage $V_{G2}$ is applied to the transistor $Q_2$, turning it on, to ensure that after the time $t_8$ the voltage of the capacitor $C_4$ is applied to the primary winding $L_1$ through the transistor $Q_2$ as a voltage opposite to that applied when the main switching element (the transistor $Q_1$) is on, in other words, as a voltage $(V_{c4} - V_{ES})$, and the primary winding $L_1$ is magnetized in the direction opposite to that when the transistor $Q_1$ is on. Thus, the current $I_{c4}$ continues to flow from the capacitor $C_4$ after the point at which it became zero. This is the state after the time $t_8$. The period between the time $t_5$ and the time $t_7$ is a second rest period during which both transistors $Q_1$ and $Q_2$ are off, and it is set to be 1/7 of the period during which the transistor $Q_1$ is off.

After the time $t_8$, the above magnetizing current flows in the opposite direction as the current $I_{c4}$ through the transistor $Q_2$, the capacitor $C_4$, and the primary winding $L_1$, thus the primary winding $L_1$ of the transformer $T_1$ is magnetized in the opposite direction, and the resultant magnetizing energy is used to effect after a time $t_9$ at which the transistor $Q_2$ turns off, as will be described below.

Note that in FIG. 3 the current $I_{c3}$ of the capacitor $C_3$, the current $I_{c4}$ of the parasitic diode $D_4$, and the current $I_{Q2}$ of the transistor $Q_2$ are denoted by (+) when they flow from the primary winding $L_1$ to the cathode of the DC source $E_S$, and by (−) when they flow in the opposite direction.

Next, at a time $t_9$, the transistor $Q_2$ turns off and the current $I_{c4}$ of the capacitor $C_4$ and the current $I_{Q2}$ of the transistor $Q_2$ become zero. However, the magnetizing current tends to flow, so it flows as a discharging current from the parasitic capacitor $C_2$ of the transistor $Q_1$ and the capacitor $C_3$. In FIG. 3, the charging current of the capacitor $C_3$ is denoted by the (+) side of the graph of the current $I_{c3}$, and the discharging current is denoted by the (−) side thereof.

After the time $t_9$, when the parasitic capacitor $C_2$ and the capacitor $C_3$ are discharging, the voltages of this parasitic capacitor $C_2$ and the capacitor $C_3$ achieve a sine-wave resonance waveform based on a transient phenomenon caused by the inductance of the primary winding $L_1$ and the parallel capacitances of the parasitic capacitor $C_2$ and the capacitor $C_3$, and said voltages reach a minimum at ¼ of the period of the resonance. The voltage between the two ends of the parasitic capacitor $C_2$ and the capacitor $C_3$ is the drain-source voltage $V_{Q1}$ of the transistor $Q_1$, and it becomes zero just before a time $t_{10}$ at ¼ of the above resonance period.

When the discharge of the parasitic capacitor $C_2$ and the capacitor $C_3$ is completed, the magnetizing current transfers to flow through a parasitic diode $D_3$ of the transistor $Q_1$. The dotted lines on the drain-source voltage $V_{Q1}$ graph of FIG. 3 show the above sine-wave resonance waveform.

The period between the time $t_9$ and the time $t_{10}$ is a first rest period during which both of the transistors $Q_1$ and $Q_2$ are off.

At the time $t_{10}$ when the magnetizing current is flowing through the parasitic diode $D_3$, the transistor $Q_1$, which is the main switching element, turns on.

Since the drain-source voltage $V_{Q1}$ becomes zero at the time $t_{10}$, the capacitor $C_3$ and, of course, the parasitic capacitor $C_2$ are completely discharged at that point, and hence the parasitic capacitor $C_2$ does not generate a short-circuit current when the transistor $Q_1$ turns on.

In this way, since the drain-source voltage $V_{Q1}$ of the transistor $Q_1$ becomes zero before the main switching element (the transistor $Q_1$) turns on, there is no period during which the voltage $V_{Q1}$ and the current $I_{Q1}$ are superimposed, and thus there are no switching losses. In addition, no short-circuit current flows from the parasitic capacitor $C_2$.

At the time when the transistor $Q_1$ turns off, the magnetizing currents transfer to the parasitic capacitor $C_2$ of the transistor $Q_1$ and the capacitor $C_3$ connected in parallel to the parasitic capacitor $C_2$, so the drain-source voltage $V_{Q1}$ rises smoothly, and there is no period during which the current $I_{Q1}$ and the voltage $V_{Q1}$ are superimposed, as described above. Therefore, no switching losses occur in the transistor $Q_1$.

Note that in the above embodiment of the present invention, the first rest period is $\frac{1}{4}$ of the resonance period that is determined by the inductance of the transformer $T_1$ and the capacitance of the first capacitor $C_3$ and parasitic capacitor $C_2$, and the second rest period is 1/7 of the period during which the main switching element (the transistor $Q_1$) is off. In practice, however, the first rest period could be set to anywhere between $\frac{1}{4}$ and 1/6 of the resonance period and the second rest period could be set less than $\frac{1}{2}$ of the period during which the main switching element (the transistor $Q_1$) is off, to have the same effect.

Another embodiment of the DC—DC converter of the present invention will be described below with reference to FIG. 2. Elements in FIG. 2 that are the same as those in FIG. 1 are denoted by the same reference notation.

The embodiment of FIG. 2 differs from that of FIG. 1 in that the first capacitor $C_3$ and a series circuit of the second capacitor $C_4$ and a transistor $Q_3$ that acts as an auxiliary switching element are both connected in parallel in the sense of AC circuit theory to the transistor $Q_1$ via the DC source $E_S$. $D_4$ denotes a parasitic diode of the transistor $Q_3$.

Both of the currents flowing through the capacitor $C_3$ and the capacitor $C_4$ are AC so AC circuit theory informs that the first capacitor $C_3$ and the series circuit of the second capacitor $C_4$ and the transistor $Q_3$ should be connected in parallel to the transistor $Q_1$, because the impedance of the DC source $E_S$ is zero. In this case, the transistor $Q_3$ that acts as the auxiliary switching element should be an n-channel insulated-gate field-effect transistor, from the viewpoint of DC applied voltage.

The overall operation of this embodiment of the present invention is the same as that of the embodiment shown in FIG. 1, and the effect obtained thereby is also the same.

It should be noted that the present invention can be applied to both self-excited and IC driven systems.

EFFECT OF THE PRESENT INVENTION

As described above, in the DC—DC converter of the present invention, the voltage between the two ends of a main switching element is zero when that main switching element turns on, so that there is no period during which voltage and current are superimposed in the main switching element, and hence no switching losses occur therein. In addition, the voltage between the two ends of the main switching element is zero when the parasitic capacitance of the main switching element has been discharged, so no current flows to short-circuit the parasitic capacitance within the main switching element, and hence no noise occurs.

When the main switching element turns off, the magnetizing current transfers to the first capacitor connected in parallel to the main switching element and the parasitic capacitance of the main switching element, so the voltage between the two ends of the main switching element rises smoothly, there is no period during which the voltage applied to the main switching element and current are superimposed, and hence no switching losses occur therein.

Therefore, since there is no need to provide much in the way of heat-dissipating countermeasures to cope with heat generated by switching losses, the present invention enables the provision of a compact-sized but highly efficient DC—DC converter. In addition, since no noise caused by the short-circuit of the parasitic capacitance of the main switching element is generated, the present invention has the advantage of providing a low-noise DC—DC converter.

What is claimed is:

1. A DC—DC convertor comprising:
    a transformer having a primary winding adapted to be connected in series with a DC power source and a secondary winding;
    a rectifier and smoothing circuit;
    a main switching means, adapted to be connected in series with said DC power source, for connecting said rectifier and smoothing circuit to said secondary winding of said transformer when said main switching means is in an on-state;
    an auxiliary switching circuit connected in parallel with said main switching means, said auxiliary switching circuit comprising a first capacitor connected in parallel with a second capacitor that is connected in series with an auxiliary switching device; and
    a signal generating circuit means for providing a first control signal to said main switching means and a second control signal to said auxiliary switching device to control on/off operation of said main switching means and said auxiliary switching device such that both said main switching means and said auxiliary switching device are in an off-state simultaneously in a manner wherein said main switching means turns on after a first rest period has elapsed after said auxiliary switching device turns off and said auxiliary switching device turns on after a second rest period has elapsed after said main switching means turns off, said first rest period being between $\frac{1}{4}$ and 1/6 of a resonance period determined by an inductance of said transformer and said first capacitor, and said second rest period being less than $\frac{1}{2}$ of a period during which said main switching means is in an off-state.

2. A DC—DC converter according to claim 1, wherein one end of each of said first capacitor and said second capacitor connected in series with said auxiliary witching device is connected to said primary winding and another end of said first capacitor and said auxiliary switching device is adapted to be connected to a positive terminal of the DC power source, whereby said first capacitor and said second capacitor connected in series with said auxiliary switching device are connected in parallel with said main switching means and are adapted to be connected in parallel with the DC power source.

3. A DC—DC converter according to claim 1, wherein said main switching means comprises an n-channel insulated-gate field effect transistor (IGFET), said auxiliary switching device comprises a p-channel IGFET, said first signal output from said signal generating means is provided to a gate of said n-channel IGFET, and said second signal output from said signal generating means is provided to a gate of said p-channel IGFET.

4. A DC—DC convertor according to claim 1, wherein said main switching means comprises an n-channel insulated-gate field effect transistor (IGFET) having a source which is adapted to be connected to a positive terminal of the DC power supply, and said auxiliary switching device comprises a p-channel IGFET.

* * * * *